US011135569B2

(12) United States Patent
Schermanz et al.

(10) Patent No.: US 11,135,569 B2
(45) Date of Patent: Oct. 5, 2021

(54) CERIA ZIRCONIA ALUMINA COMPOSITION WITH ENHANCED THERMAL STABILITY

(71) Applicants: TREIBACHER INDUSTRIE AG, Treibach-Althofen (AT); SASOL GERMANY GMBH, Hamburg (DE)

(72) Inventors: Karl Schermanz, Launsdorf (AT); Amod Sagar, Althofen (AT); Marcos Schöneborn, Hamburg (DE); Reiner Glöckler, St. Michaelisdonn (DE); Kai Dallman, Brunsbüttel (DE); Frank Alber, Hamburg (DE); Sonke Rolfs, Itzehoe (DE)

(73) Assignees: TREIBACHER INDUSTRIE AG, Treibach-Althofen (AT); SASOL GERMANY GMBH, Hamburg (DE)

( * ) Notice: Subject to any disclaimer, the term of this patent is extended or adjusted under 35 U.S.C. 154(b) by 0 days.

(21) Appl. No.: 15/882,022

(22) Filed: Jan. 29, 2018

(65) Prior Publication Data
US 2018/0147559 A1 May 31, 2018

Related U.S. Application Data

(62) Division of application No. 13/549,020, filed on Jul. 13, 2012, now Pat. No. 9,889,428.

(30) Foreign Application Priority Data

Jul. 14, 2011 (DE) .......................... 102011107702.6
Dec. 16, 2011 (EP) ...................................... 11193944

(51) Int. Cl.
*B01J 21/04* (2006.01)
*B01J 23/10* (2006.01)
*B01J 37/00* (2006.01)
*B01J 37/02* (2006.01)
*B01J 37/03* (2006.01)
*B01J 37/04* (2006.01)
*B01J 35/10* (2006.01)

(52) U.S. Cl.
CPC .............. *B01J 21/04* (2013.01); *B01J 23/10* (2013.01); *B01J 37/0045* (2013.01); *B01J 37/0201* (2013.01); *B01J 37/0203* (2013.01); *B01J 37/031* (2013.01); *B01J 37/033* (2013.01); *B01J 37/04* (2013.01); *B01J 35/1014* (2013.01); *B01J 35/1019* (2013.01); *B01J 2523/00* (2013.01)

(58) Field of Classification Search
CPC . B01J 21/04; B01J 21/066; B01J 23/10; B01J 37/0045; B01J 37/0201; B01J 37/0203; B01J 37/031; B01J 37/37; B01J 37/033; B01J 37/04; B01J 37/08; B01J 37/12;
B01J 35/1014; B01J 35/1019; B01J 2523/31; B01J 2523/3712; B01J 2523/37; B01J 2523/48; C01P 2006/12; C01P 2006/13
USPC ................. 502/304, 349, 351, 355; 423/263, 423/594.12, 600, 608
See application file for complete search history.

(56) References Cited

U.S. PATENT DOCUMENTS

| | | | | |
|---|---|---|---|---|
| 3,870,455 A | * | 3/1975 | Hindin | B01J 23/6522 431/7 |
| 3,956,188 A | * | 5/1976 | Hindin | B01D 53/8628 431/2 |
| 4,021,185 A | * | 5/1977 | Hindin | B01D 53/8628 431/7 |
| 5,883,037 A | | 3/1999 | Chopin et al. | |
| 6,306,794 B1 | | 10/2001 | Yamazaki et al. | |
| 6,335,305 B1 | | 1/2002 | Suzuki et al. | |
| 6,831,036 B1 | | 12/2004 | Suzuki et al. | |
| 7,341,976 B2 | | 3/2008 | Espinoza et al. | |
| 7,939,041 B2 | | 5/2011 | Darab | |
| 9,889,428 B2 | * | 2/2018 | Schermanz | B01J 37/031 |
| 2008/0096760 A1 | * | 4/2008 | Darab | B01J 23/002 502/303 |
| 2008/0312070 A1 | | 12/2008 | Talbot et al. | |
| 2009/0023581 A1 | | 1/2009 | DiMonte et al. | |
| 2009/0274599 A1 | | 11/2009 | Larcher et al. | |
| 2010/0130349 A1 | | 5/2010 | Bae et al. | |
| 2010/0260652 A1 | | 10/2010 | Nakane et al. | |
| 2012/0129690 A1 | * | 5/2012 | Larcher | B01J 23/44 502/304 |
| 2013/0023410 A1 | * | 1/2013 | Schoneborn | B01J 21/04 502/439 |
| 2013/0108530 A1 | * | 5/2013 | Chang | B01J 37/088 423/213.5 |

FOREIGN PATENT DOCUMENTS

| | | | | |
|---|---|---|---|---|
| CN | 101448567 | | 6/2009 | |
| CN | 101511479 | | 8/2009 | |
| CN | 10 1745375 | * | 6/2010 | ............. B01D 53/94 |
| CN | 101745375 A | | 6/2010 | |
| CN | 10 3349978 | * | 10/2013 | ............. B01D 53/94 |

(Continued)

OTHER PUBLICATIONS

Di Monte et al., "Pd1Ce$_{0.6}$Zr$_{0.4}$O$_2$/Al$_2$O$_3$ as advanced materials for three-way catalysts Part 1. Catalyst characterisation, thermal stability and catalytic activity in the reduction of NO By CO", Applied Catalysis B, 2000, 24, pp. 157-167.
European Search Report dated May 30, 2012 in reference to European Application No. 11193944.3.

(Continued)

*Primary Examiner* — Patricia L. Hailey
(74) *Attorney, Agent, or Firm* — Workman Nydegger

(57) ABSTRACT

The subject matter of the invention is a method for producing composites, comprising mixed oxides of aluminum oxide and cerium/zirconium, hereinafter referred to briefly as Al/Ce/Zr oxide composite(s), using boehmite and soluble cerium/zirconium salts. Al/Ce/Zr oxide composites produced in this way have an increased thermal stability.

4 Claims, 2 Drawing Sheets

(56) References Cited

FOREIGN PATENT DOCUMENTS

Figure 1:
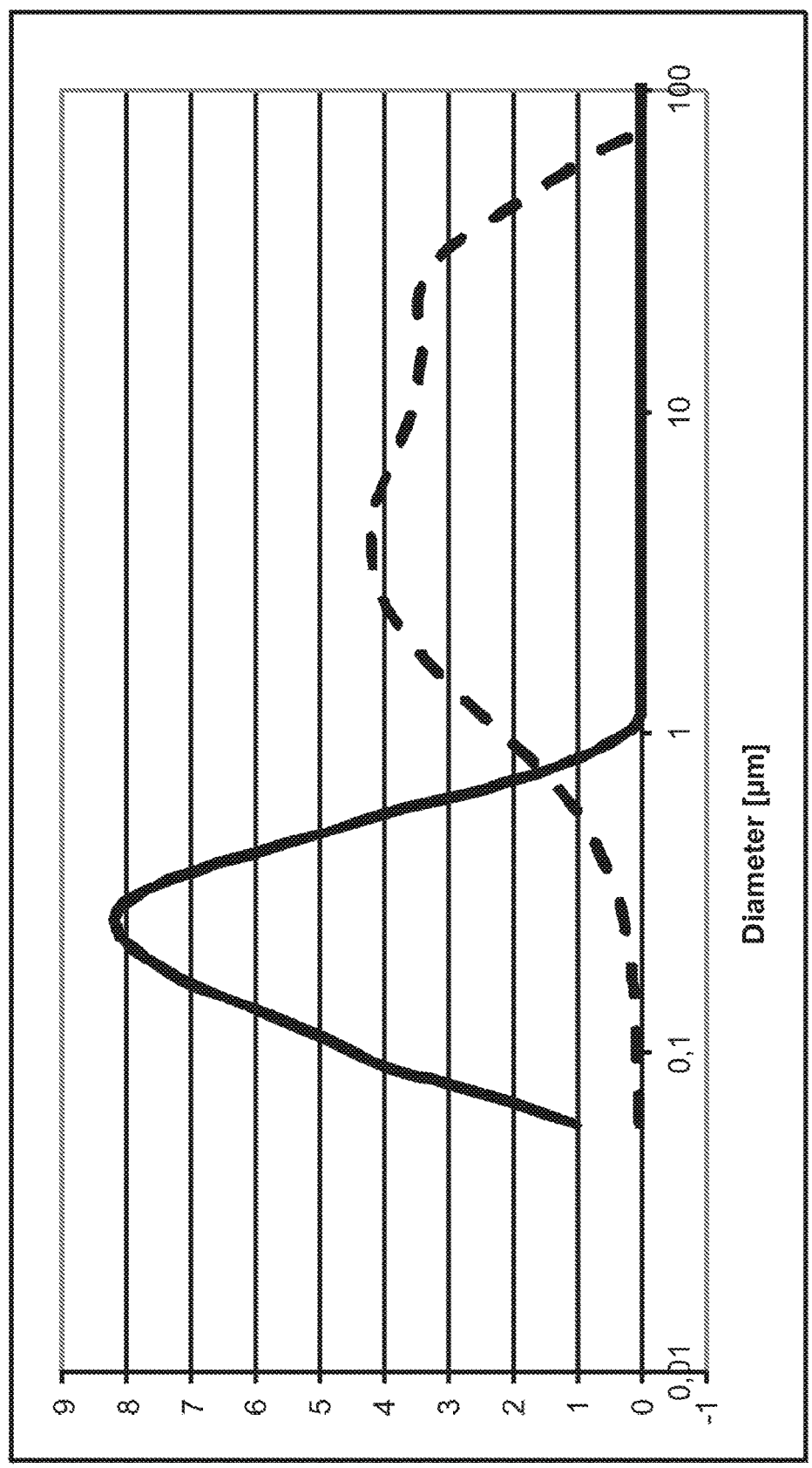
Figure 2:
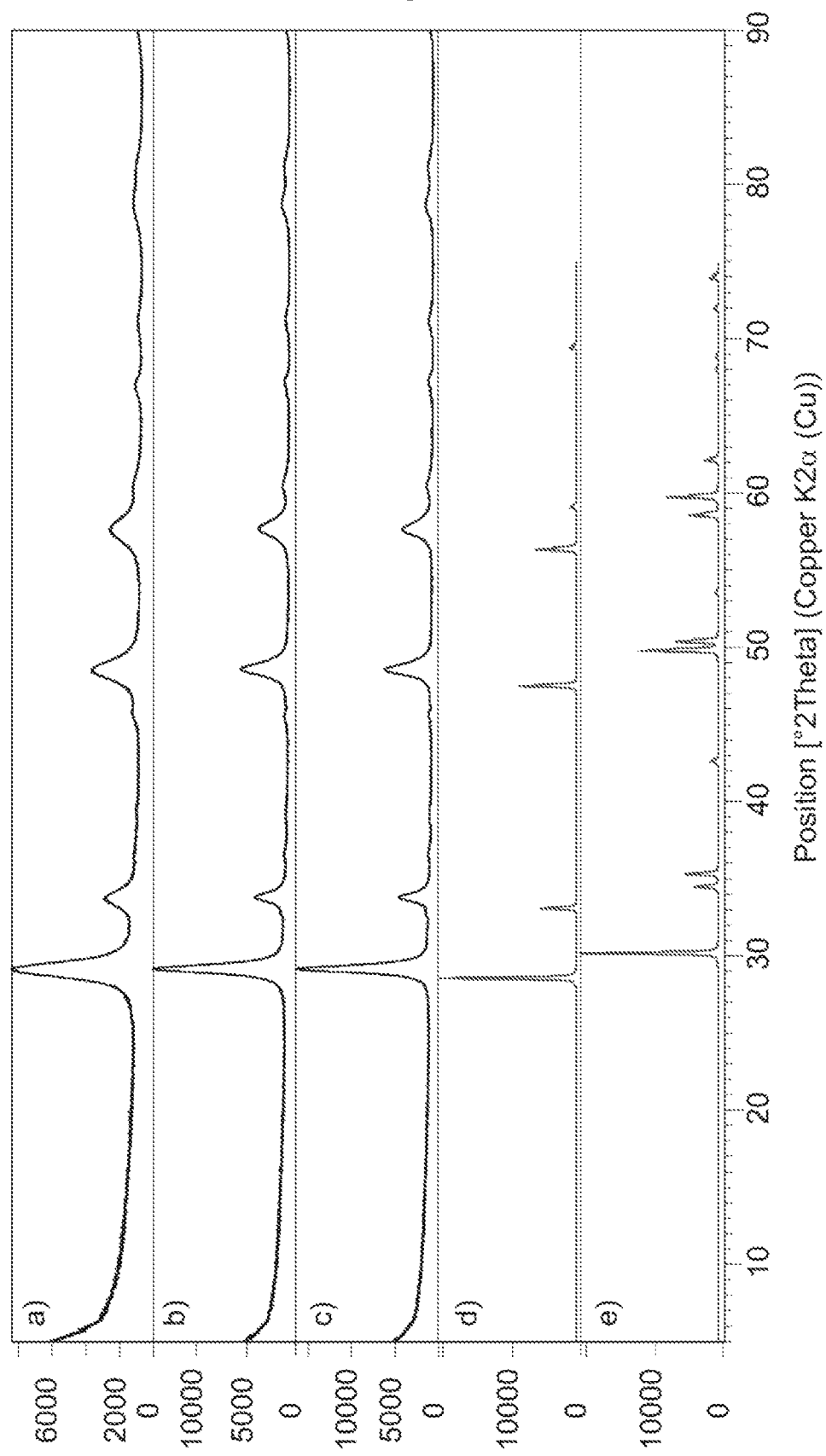

| DE | 10332775 | 2/2005 |
| EP | 1172139 | 1/2002 |
| JP | 2008540309 | 11/2008 |
| JP | 2010260046 | 11/2010 |
| WO | WO2006070201 | 7/2006 |
| WO | WO2006119549 | 11/2006 |
| WO | WO2006119550 | 11/2006 |
| WO | WO2008113457 | 9/2008 |
| WO | WO201267654 | 5/2012 |
| WO | 2016/119549 A1 | 8/2016 |

OTHER PUBLICATIONS

Fernandez-Garcia et al., "Structural Characteristics and Redox Behavior of $CeO_2$—$ZrO_2/Al_2O_3$ Supports", Journal of Catalysis. 2000, 194, pp. 385-392.

Guillen-Hurtado et al., "Influence of the Cerium Precursor on the Physico-Chemical Features and NO To $NO_2$ Oxidation Activity of Ceria-Zirconia Catalysts", Journal of Molecular Catalysis A, 2010, 323, pp. 52-58.

Letichevsky et al., "Obtaining $CeO_2$—$ZrO_2$ Mixed Oxides by Coprecipitation: Role of Preparation Conditions", Applied Catalysis B, 2005, 58, pp. 203-210.

Martinez-Arias et al., "Influence of thermal sintering on the activity for CO—$O_2$ and CO—$O_2$—NO stoichiometric reactions over Pd/(Ce, Zr)$O_x/Al_2O_3$ catalysts", Applied Catalysis B, 2002, 38, pp. 151-158.

Office Action for Japanese Patent Application No. JP2014519422 dated Dec. 21, 2016.

Vishista et al., "Role of deflocculants on the rheological properties of boehmite sol", Material 58 (2004), pp. 1576-1581.

Vlaic et al., "Relationship between the Zirconia-Promoted Reduction in the Rh Loaded $Ce_{0.5}Zr_{0.5}O_2$ Mixed Oxide and the Zr—O Local Structure", Journal of Catalysis 1997, 168, pp. 386-392.

Vlaic et al., "Redox Property-Local Structure Relationships in the Rh-Loaded $CeO_2$—$ZrO_2$ Mixed Oxides", Journal of Catalysis 1999, 182, pp. 378-389.

U.S. Appl. No. 14/232,765, filed Mar. 25, 2014, Final Office Action dated Nov. 14, 2016.

\* cited by examiner

CERIA ZIRCONIA ALUMINA COMPOSITION WITH ENHANCED THERMAL STABILITY

CROSS-REFERENCE TO RELATED APPLICATIONS

This Application is a division of U.S. patent application Ser. No. 13/549,020, filed Jul. 13, 2012, which claims the benefit of European Patent Application No. EP 11193944.3, filed Dec. 16, 2011, and German Patent Application No. DE 102011107702.6, filed Jul. 14, 2011, the disclosures of which are incorporated herein in their entirety.

BACKGROUND

The present invention refers to compositions based on ceria (oxide of cerium), zirconia (oxide of zirconium) and alumina (oxide of aluminium) with enhanced thermal stability.

Such compositions may be used as washcoats in the application of exhaust gas aftertreatment of combustion engines such as fuel- and diesel engines, e.g. as components of catalysts (mainly Three Way Catalysts, TWC), but also in other parts integrated into the exhaust stream such as NOx traps, Diesel Oxidation Catalysts (DOC) and Diesel Particulate Filters (DPF).

Ceria-Zirconia based mixed oxides and alumina are widely used in automotive application for catalyst preparation. For example, in WO 2008/113457 the preparation of washcoats introducing separately mixed oxides of ceria/zirconia and alumina (lanthanum doped aluminium oxide) is described and thus is a well established process.

However, there is also drawn attention to other types of composition materials consisting of $Al_2O_3$ with the balance typically being $CeO_2$, $ZrO_2$, and optionally stabilizers such as rare earth metal oxides or non rare earth metal oxides. For example, in U.S. Pat. No. 5,883,037 such types of composition materials are described paying attention also to the surface stability of such compounds. E.g. in column 1, line 32 to 35 it is reported that surface stability of Ce—Zr-Alumina based materials amongst other properties is important to be effective as a catalyst. In more detail, example 1 of U.S. Pat. No. 5,883,037 refers to a composition of 50% $Al_2O_3/La_2O_3$ (97%/3%) and 50% $CeO_2/ZrO_2/Pr_6O_{11}/Fe_2O_3$ (56%/30%/7%/7%). The composition exhibits a specific surface area of 52 $m^2/g$ after being heat treated at 600° C. for 2 hours and after additional heat treatment for 2 hours at 1050° C. No values on specific surface area are reported for heat treatment at higher temperatures and/or for a longer period of time.

In EP 1 172 139 there is reported the preparation and the thermal stability of several Al—Ce—Zr—Y—La composition oxides and various compositions consisting of $Al_2O_3/CeO_2/ZrO_2/Y_2O_3$ $La_2O_3$ with different ratios of the oxides are disclosed. The materials are described to be prepared via co-precipitation starting from the corresponding metal salt solutions. As intermediates suspensions of Al—Ce—Zr—Y—La hydroxides are formed which after calcination were transferred into the corresponding oxides (see page 8, lines 1 to 6). The surface area of such composition oxides is described to be dependent on the amount of $Al_2O_3$ being present in the composition. In examples 10 to 22 in which the $Al_2O_3$ content is in the range between 21 and 25 weight % (calculated from the molar ratios disclosed in table 2) the specific surface area is less than 15 $m^2/g$ after the compounds have been subjected to heat treatment at 1100° C. for 20 hours (see table 2 page 14). Higher values of the surface area are indicated after heat treatment at 1100° C./20 hours in case that the $Al_2O_3$ content is increased as disclosed in the examples 24, 27 and 31. More in detail, in example 24 corresponding to a composition with an $Al_2O_3$ content of 57% weight, there is disclosed a surface area of 27 $m^2/g$ after calcination at 1100° C./20 hours, and in examples 27 and 31 which correspond to an $Al_2O_3$ content of 63%, surface areas of 31 $m^2/g$ and 30 $m^2/g$, respectively, after calcination at 1100° C./20 hours are indicated.

In WO 2006/070201 there is reported an improved method for the formation of composition hydroxides or oxides comprising, on an oxide basis, alumina ($Al_2O_3$) and Zirconia ($ZrO_2$), and optionally including at least one member selected from $CeO_2$, $La_2O_3$, $Nd_2O_3$, $Pr_6O_{11}$, $Sm_2O_3$, $Y_2O_3$ and optionally other rare earth metal oxides. The compounds are described to be made by co-precipitation starting from a metal salt solution using caustic alkali as a precipitation agent. A strict narrow pH range is to be kept: According to WO 2006/070201 the deviation of the pH during precipitation must not be more than +/−1. In example 6 in WO 2006/070201 a Al/Ce/Zr-composition oxide is reported consisting of 51% $Al_2O_3$, 14.2% $CeO_2$ and 34.8% $ZrO_2$ exhibiting a surface area of 43 $m^2/g$ after being heat treated at 850° C./4 hours and at 1100° C./2 hours. After more severe ageing (heat treatment at 850° C./4 hours and 1200° C./2 hours) the compound exhibits a surface area of 16 $m^2/g$ only. No information on the surface areas are disclosed for the case where the composition oxide is heat treated for a longer period of time, e.g. 850° C./4 hours+1150° C./36 hours. Beside the disadvantage of the drop in surface area after long ageing time moreover the process for manufacturing the composition oxides as disclosed in WO 2006/070201 has some disadvantages. Namely, the precipitate formed by co-precipitation from the mixed metal-solution (Al, Ce, Zr) requires an extensive washing and re-slurrying for proper removal of the caustic alkali which was used for precipitating the metal composition. In addition, a hydrothermal treatment at 120° C. of the material obtained prior to final calcination of the hydroxides (wet cake) is described to be required to get material with reasonable stability in surface area. However, though the materials are described to be re-slurried and subjected to extensive washing the final products still contains Na in a range of up to 100 ppm. Na is an undesired impurity in materials for automotive application since it might be detrimental to the action of rhodium which for example is part of a three way catalyst for the removal of NOx (see e.g. Norman Macleod et al. in Applied Catalysis B: Environmental, Volume 33, Issue 4, Oct. 25, 2001, Pages 335-343). In addition, the use of huge amounts of caustic alkali in the precipitation step generates heavily contaminated nitrate containing waste water causing environmental concerns.

In U.S. Pat. No. 6,831,036 contacting cerium and zirconium nitrates in aqueous solution with Boehmite is described.

In U.S. Pat. No. 6,306,794 the preparation of composite oxides aluminiumoxide and cerium/zirconium oxides) and a binder is described. Hydroxides from cerium and zirconium are not indicated in U.S. Pat. No. 6,306,794.

In WO 2006/119549 there is described the dissolution of nitrates of cerium and zirconium.

Hydroxides of cerium and zirconium are not water soluble and are thus not present in a salt solution of cerium/zirconium.

In spite of the fact that oxides of alumina and oxides of ceria/zirconia as well as composition oxides of Al/Ce/Zr are already used worldwide in automotive applications, there is still the need to improve production routes and the performance of such materials, especially in terms of their thermal stability to avoid a drop of surface area when exposing such materials to higher temperatures and to enhance the life time of such catalysts.

SUMMARY

The present invention is aimed to solve disadvantages related with the limited thermal stability of Al/Ce/Zr compositions and to improve the manufacturing process of such compounds/compositions; in particular to avoid co-precipitation with formation of huge amount of waste water and hydrothermal treatment steps and moreover, to provide compositions with enhanced surface stability, particularly after long term ageing.

DETAILED DESCRIPTION

In one aspect the present invention provides a process for the preparation of a calcined mixed oxide comprising Al-, Ce- and Zr-oxides, comprising the steps of
  (a) providing an aqueous slurry comprising hydroxides of cerium and zirconium,
  (b) contacting the hydroxides of cerium and zirconium with an alumina precursor to obtain an aqueous suspension of solids,
  (c) isolating the solids from the aqueous suspension and drying to obtain a solid composition,
  (d) calcining the solid composition of step (c) at a temperature from 450° C. to 1200° C. for at least 1 hour to obtain a calcined mixed oxide.

The Al/Ce/Zr-oxides according to the present invention preferably have surface areas (BET) exceeding 20 $m^2/g$ or even 30 $m^2/g$ when treated for 4 h at 1200° C.

A process provided by the present invention is herein also designated as "A process of (according to) the present invention."

Preferably the aqueous slurry in step (a) comprises cerium calculated as cerium oxide ($CeO_2$) in the range of 5% to 90% by weight based on the total oxide content (TO) of the calcined mixed oxide.

Preferably the calcined mixed oxide in step (d) comprises cerium from 5% to 90% by weight, preferably 5% to 50% by weight, aluminium from 20% to 80% by weight, preferably 40% to 70% by weight, zirconium from 5% to 80% by weight, preferably 5% to 40% by weight, and optionally rare earth metals (RE) from 0% to 12% by weight, preferably 0.1% to 9% by weight; wherein cerium, zirconium, and rare earth metals (RE) are calculated as $CeO_2$, $ZrO_2$, $Al_2O_3$, or $RE_2O_3$, respectively.

In another aspect the present invention provides a process according to the present invention, wherein the calcined mixed oxide comprises
  cerium from 5% to 90% by weight, preferably 5% to 50% by weight,
  aluminium from 20% to 80% by weight, preferably 40% to 70% by weight,
  zirconium from 5% to 80% by weight, preferably 5% to 40% by weight, and optionally
  0% to 12% by weight, preferably 0.1% to 9% by weight of rare earth metals (RE);
  wherein cerium, zirconium, and rare earth metals (RE) are calculated as $CeO_2$, $ZrO_2$, $Al_2O_3$, or $RE_2O_3$, respectively.

An advantageous embodiment of a process of the present invention is characterized in that the Ce/Zr-hydroxides used according to step (a) contain at least one rare earth metal element, preferably selected from Y, La, Pr, Nd, Sm, Eu, Gd, Tb, Dy, Ho, Er, Tm, Yb and Lu.

In another aspect the present invention provides a process according to the present invention, wherein the aqueous slurry in step (a) further comprises one or more hydroxides of rare earth metals other than cerium.

An aqueous slurry as defined in step (a) in a process of the present invention includes either an aqueous slurry 1, or an aqueous slurry 2. An aqueous slurry 1 is a suspension of hydroxides of cerium and zirconium, optionally comprising further rare earth metal salts which was treated with ammonium hydroxide, and optionally with $H_2O_2$ and/or a surfactant.

An aqueous slurry 2 is an aqueous slurry 1 isolated (e.g. filtrated) as a solid (Wet Cake) and re-suspended in water, optionally further treated, e.g. with ammonia and/or a surfactant.

Step (a) may be carried out by providing an aqueous solution of cerium and zirconium salts, optionally in combination with other rare earth metal salts and treating the aqueous solution with aqueous ammonium hydroxide. Optionally and preferably a treatment with $H_2O_2$ is carried out, either before ammonium hydroxide treatment, or after ammonium hydroxide treatment. A pH of 7 and higher, e.g. 7 to 10 of the aqueous slurry is adjusted. A precipitate forms and aqueous slurry 1 is obtained. Aqueous slurry 1 may be used in a step (b) as such, or the solid from aqueous slurry 1 may be isolated (Wet Cake), e.g. by filtration and the isolated solid may be resuspended and further treated with ammonia. Optionally a treatment with a surfactant is carried out, either slurry 1 or slurry 2, or the isolated solid from slurry 1 may be contacted with a surfactant. Step (a) preferably is carried out at temperatures from 10° C. to 40° C., preferably at room temperature.

Step (b) may be carried out by mixing the aqueous slurry of step (a), or the isolated solids from the aqueous slurry of step (a) with an alumina precursor, e.g. aluminium hydroxide, e.g. a Boehmite, in aqueous suspension. Step (b) preferably is carried out at temperatures from 10° C. to 40° C., preferably at room temperature. An aqueous suspension of solids is obtained. Optionally a treatment with a surfactant is carried out in step (b) by adding a surfactant to the aqueous suspension. Optionally the alumina precursor may be treated with a surfactant before mixing with the aqueous suspension of step (a).

In step (c) the solids from the aqueous suspension are isolated, e.g. by filtration, centrifugation, preferably filtration and are dried. Drying preferably is carried out at temperatures from 90° C. to 150° C., optionally under vacuum. Optionally the solid composition is contacted, e.g. impregnated with a surfactant. A solid composition is obtained which is subjected to step (d).

The solid composition obtained in step (c) is subjected to calcination in step (d), i.e. heat treated at temperatures from 450° C. to 1200° C., preferably 600° C. to 1000° C., e.g. 800° C. to 900° C., for at least 1 hour, e.g. for several hours, e.g. 1 hour to 10 hours, such as 2 hours to 6 hours.

According to the present invention it was surprisingly found that the use of a surfactant in a process of the present invention may influence, e.g. may increase the stability of the surface area of the final Al/Ce/Zr composition.

If a surfactant is used in a process according to the present invention, preferably either the starting mixture of step (a) comprises a surfactant, e.g. a surfactant is added in step (a), or a surfactant is added in step (b); or a surfactant is added in step (d).

In another aspect the present invention provides a process according to the present invention comprising using a surfactant; e.g. the aqueous slurry of step (a) comprises a surfactant, e.g. a surfactant is added in step (a); and/or the aqueous suspension of solids in step (b) comprises a surfactant, e.g. a surfactant is added in step (b); and/or the solid composition in step (d) comprising a surfactant, e.g. a surfactant is added to the solid composition in step (d).

In one embodiment of the present invention in a process of the present invention the aqueous slurry in step (a) and/or the aqueous suspension of solids in step (b) comprises a surfactant, e.g. wherein the surfactant is added before the solid component is added.

Appropriate surfactants for use in a process of the present invention include compounds which lower the interfacial tension of a liquid and a solid, e.g. including organic compounds, e.g. such which are amphiphilic and contain both hydrophobic groups and hydrophilic groups. Preferred surfactants include nonionic surfactants, e.g. nonionic surfactants comprising ethylene oxide/propylene oxide units, such as Triton®, Tergitol®, e.g. including ethyl phenol ethoxylates and ethylene oxide/propylene oxide copolymers, or lauric acid.

In another aspect the present invention provides a process according to the present invention, wherein the drying in step (c) comprises i) filtration and air drying, e.g. drying at elevated temperatures and/or, ii) spray drying.

It was also surprisingly found that the enhanced stability of surface area of the Al/Ce/Zr compositions may be influenced by the chemical nature of the alumina precursor used. Interesting results are obtained, if the alumina precursor in step (b) comprises Boehmite of formula $(AlO(OH)xH_2O)$ and optionally aluminium hydroxide, optionally the alumina precursor in step (b) consists of Boehmite.

A preferred Boehmite in a process of the present invention has pore volumes of 0.4 to 1.2 ml/g and/or crystallite sizes of 4 nm to 40 nm, preferably 4 nm to 16 nm, measured at the (120) reflection.

Independent thereof a Boehmite in a process of the present invention preferably has a purity as follows: Contents of
Si approximately 0.01% or lower, calculated as $SiO_2$;
$Fe_2O_3$ approximately 0.01% or lower calculated as $Fe_2O_3$;
Na approximately 0.002% or lower, calculated as $Na_2O$;
K approximately 0.002% or lower, calculated as $K_2O$;
Ti approximately 0.005% or lower, calculated as $TiO_2$,
other elements approximately 0.01% or lower, calculated as their oxides.

A Boehmite according to the present invention is a compound of formula $AlO(OH) \times H_2O$. Preferred is a Boehmite obtainable by hydrolysis of aluminium alcoholate, e.g. obtainable via a process as disclosed in U.S. Pat. No. 5,055,019 ("Process for the Production of Boehmitic Aluminas"). According to this process boehmitic alumina with a purity of at least 99.95% $Al_2O_3$ is obtained having defined pore radii in the range of 3 nm to 100 nm by salt-free hydrolysis of aluminium alcoholates in water, whereby the Boehmite slurry obtained is aged in a autoclave at a water vapour pressure of 1 bar to 30 bar corresponding to a temperature of 100° C. to 235° C. over a period of time of 0.5 hour to 20 hours and by stirring with a circumferential speed of 1.0 m/s to 6.0 m/s.

According to a preferred embodiment of the present invention aluminium alcoholates are used as starting material to obtain a Boehmite of high purity. The aluminium alcoholates can be produced by the so called Ziegler-Process preferably comprising a filtration step as a cleaning step. $C_1$- to $C_{24}$-alcohols, or mixtures thereof may be used to form the aluminium alcoholates.

According to another preferred embodiment a Boehmite or Boehmite slurry used comprise lanthanum or barium compounds, preferably such which are soluble in water under the reaction conditions, in order to obtain a Boehmite, comprising 1% to 10% by weight of lanthanum and/or barium, calculated as $La_2O_3$ or BaO, respectively, The process of the present invention is useful for the preparation of a catalyst composition with outstanding favorable and surprising properties as described herein.

In comparative example 1 of the present application it is shown that, in case that the co-precipitation process as disclosed in EP 1 172 139 is applied to a composition being different from the compositions disclosed therein, a material with significant lower surface stability in comparison with a composition prepared according to the present invention is obtained. On preparing a composition consisting of 50% $Al_2O_3$, 10% $CeO_2$, 36.5% $ZrO_2$, 1% $La_2O_3$ and 2.5% $Nd_2O_3$ according to the process disclosed in EP 1 172 139 a surface area of 31 $m^2/g$ is obtained after ageing of the material at 1100° C./20 hours. In contrast to that, if a process according to the present invention is used for the preparation of the identical composition, significant higher surface areas after ageing at 1100° C./20 hours, namely in a range from 40 $m^2/g$ to 50 $m^2/g$ are obtained, e.g. as lined out in examples 4 to 9 and 16 to 19 of the present application.

For the purpose of investigating the surface stability at more severe ageing conditions (higher temperatures and longer ageing time) comparative example 2 is provided in the present application. It is shown that a composition consisting exactly of the same components as referred to in example 1 and prepared according to example 1 of U.S. Pat. No. 5,883,037 by contacting a lanthanum doped alumina with a precipitate generated by ammonia out of a mixed metal salt solution based on ceria/zirconia/praseodymium and iron, exhibits a surface area of 27 $m^2/g$ after calcination at 1100° C./4 hours, but only 5 $m^2/g$ after calcination at 1150° C./36 hours and 7 $m^2/g$ after calcination at 1200° C./4 hours.

To investigate the properties of heat stability after ageing for a longer period of time a compound was synthesized as disclosed in comparative example 3 of the present application according to the method of example 6 of WO 2006/070201. The surface area values found for the after heat treatment at 850° C./4 hours and 1050° C./36 hours and after heat treatment at 850° C./4 hours and 1150° C./36 hours were 50 $m^2/g$ (850° C.) and 19 $m^2/g$ (1050° C./1150° C.), respectively.

Thus, in a further aspect the present invention provides a composition, e.g. a catalyst composition obtainable, e.g. obtained, according to a process of the present invention.

A calcined mixed oxide obtainable, e.g. obtained, according to a process of the present invention preferably is a composite material comprising aluminium oxide and a solid solution of cerium oxide and zirconium oxide, optionally further comprising rare earth metal oxides.

According to the present invention it was found that a Boehmite may improve the stability of surface area of Al/Ce/Zr-oxide compositions.

In a further aspect the present invention provides the use of a Boehmite for improving the stability of surface area of Al/Ce/Zr-oxide compositions.

A solid solution of cerium oxide and zirconium oxide, optionally further comprising rare earth metal oxides may be obtained as appropriate, e.g. according, e.g. analogously, to a known process.

In the following examples all temperatures are in degree Celsius (° C.) and are uncorrected.

The following abbreviations are used in the description and examples herein:

BET BET theory aims to explain the physical adsorption of gas molecules on a solid surface and serves as the basis for an important analysis technique for the measurement of the specific surface area of a material. In 1938, Stephen Brunauer, Paul Hugh Emmett, and Edward Teller published an article about the BET theory in for the first time in *J. Am. Chem. Soc.*, 1938, 60, 309 (Internet doi:10.1021/ja01269a023). "BET" consists of the first initials of their family names.

ROI Residue on Ignition at 1000° C./2 hours rt room temperature

TO Total Oxide

The percent indication of the oxides as indicated herein are indications in "% by weight." Surface area (BET) analysis was performed with Quantachrome NOVA 4000 according to DIN (Deutsche Industrie Norm) 66131 under use of $N_2$.

An aqueous slurry as referred to herein is either an aqueous slurry 1, or an aqueous slurry 2.

An aqueous slurry 1 is a suspension of hydroxides of cerium and zirconium, optionally comprising further rare earth metal salts which was treated with ammonium hydroxide, and optionally with $H_2O_2$ and/or a surfactant.

An aqueous slurry 2 is an aqueous slurry 1 isolated as a solid (Wet Cake) and re-suspended in water, optionally further treated, e.g. with ammonia and/or a surfactant.

Preparation of Raw Materials

Example A

Preparation of Ce/Zr/Rare Earth Hydroxide Suspension (Aqueous Slurry, Designated as "Wet Cake A" "Wet Cake B" and "Wet Cake C" after Filtration)

Example A1

Wet Cake A: $CeO_2(29\%)$ $ZrO_2(62\%)$ $La_2O_3$ (9%)/TO 117.97 kg of an aqueous solution of cerium nitrate ($CeO_2$ content=29.5%), 555.22 kg of an aqueous solution of zirconium nitrate ($ZrO_2$ content=13.4%) and 29.03 kg of lanthanum nitrate in the form of crystals ($La_2O_3$ content=37.2%) were mixed with 497.78 kg of deionised water. The mixture obtained was stirred for 30 minutes and a clear solution was obtained. To the solution obtained 18% aqueous ammonium hydroxide were added under virgourous stirring. A pH=3 was adjusted and to the mixture obtained 52.9 kg of aqueous $H_2O_2$ (30%) were added simultaneously with ammonia until a pH=7.25 was adjusted. The mixture obtained was stirred for another half an hour. A precipitate formed and an aqueous slurry 1 was obtained. The aqueous slurry 1 obtained was filtered via a filterpress. $CeO_2(29\%)$ $ZrO_2(62\%)$ $La_2O_3(9\%)$/TO was obtained in the form of a solid and was washed with deionised water to obtain Wet Cake A: $CeO_2(29\%)$ $ZrO_2(62\%)$ $La_2O_3(9\%)$/TO.

Yield=approximately 500 kg of Wet Cake A corresponding to 120 kg of TO.

ROI=24.2%

Example A2

Wet Cake B: $CeO_2(20\%)$ $ZrO_2(73\%)$ $La_2O_3(2\%)$ $Nd_2O_3$ (5%)/TO 346.6 g of an aqueous solution of cerium nitrate ($CeO_2$ content=28.9%), 1503.9 g of an aqueous solution of zirconium nitrate ($ZrO_2$ content=24.27%), 26.53 g of lanthanum nitrate in the form of crystals ($La_2O_3$ content=37.7%) and 65.45 g of neodymium nitrate in the form of crystals ($Nd_2O_3$ content=38.2%) were treated with 2026 mL of deionised water and the mixture obtained was stirred for a few minutes and a clear solution was obtained. To the solution obtained 994.6 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of approximately 40 mL/minute until a pH=9.5 was adjusted. A precipitate formed and and an aqueous slurry 1 was obtained. The aqueous slurry 1 obtained was filtered. $CeO_2(20\%)$ $ZrO_2(73\%)$ $La_2O_3(2\%)$ $Nd_2O_3(5\%)$/TO was obtained in the form of a solid and was thoroughly washed with deionised water to obtain Wet Cake B: $CeO_2(20\%)$ $ZrO_2(73\%)$ $La_2O_3(2\%)$ $Nd_2O_3(5\%)$/TO.

Yield=approx. 2750 g of Wet Cake B corresponding to 495 g of TO

ROI=18%

Example A3

Wet Cake C: $CeO_2(56.3\%)$ $ZrO_2(40.4\%)$ $La_2O_3(1.2\%)$ $Y_2O_3(1.05\%)$/TO 971.5 g of an aqueous solution of cerium nitrate ($CeO_2$ content=28.9%), 947.5 g of an aqueous solution of zirconium nitrate ($ZrO_2$ content=21.33%), 15.53 g of lanthanum nitrate in the form of crystals ($La_2O_3$ content=37.7%) and 35.2 g of yttrium nitrate in the form of crystals ($Y_2O_3$ content=29.8%) were mixed with 2000 mL of deionised water and the mixture obtained was stirred for a few minutes and a clear solution was obtained. To the solution obtained 902 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of approximately 40 mL/minute until a pH=9.5 was adjusted. A precipitate formed and an aqueous slurry 1 was obtained. The aqueous slurry 1 obtained was filtered. The solid obtained was thoroughly washed with deionised water to obtain Wet Cake C: $CeO_2(56.3\%)$ $ZrO_2$ (40.4%) $La_2O_3(1.2\%)$ $Y_2O_3(1.05\%)$/TO.

Yield=approx. 2212 g of Wet Cake C, corresponding to 500 g of TO

ROI=22.6%

Example B

Preparation of Boehmite Powder and Boehmite Suspension

Example B1

Preparation of (Commercially Available) Boehmite DISPERAL HP 14

An alumina suspension or slurry resulting from neutral aluminium alkoxide hydrolysis was prepared in the following manner: An aluminium alkoxide mixture, such as obtained as an intermediate during the synthesis of the Ziegler/Alfol process, was hydrolyzed at 90° C. in a stirring vessel with deionized water. Two immiscible phases were obtained, i.e. an upper alcohol phase and a lower alumina/ water phase. The alumina/water phase contained Boehmite with an $Al_2O_3$ content of 10-11%. 500 g of this alumina/water phase (pH 9) were separated and added to a reactor in batch wise operation, at ambient reactor pressure and at 98° C. After setting the reactor conditions, ageing took place for 16 hours using a conventional stirrer with a peripheral speed of 1.6 m/s corresponding to a stirring rate of 500 rpm. The crystallite size of the spray dried material, measured at the (120) reflection was 13.5 nm. DISPERAL HP 14 was obtained.

Preparation of Aluminium-Hydroxide Suspensions
Boehmite Suspension Type 1

20.10 g of commercially available DISPERAL HP 14 ($Al_2O_3$ content 79.6%) were added to 379.9 g of water and stirred externally for 10 minutes.

Example B2

Preparation of (Commercially Available) Boehmite PURAL SB

An alumina suspension or slurry resulting from neutral aluminium alkoxide hydrolysis was prepared in the following manner: An aluminium alkoxide mixture, such as obtained as an intermediate during the synthesis of the Ziegler/Alfol process, was hydrolyzed at 90° C. in a stirring vessel with deionized water. Two immiscible phases were obtained, i.e. an upper alcohol phase and a lower alumina/water phase. The alumina/water phase contained Boehmite and the alumina/water phase was separated. The crystallite size of the spray dried material, measured at the (120) reflection, 2 was 5.0 nm. PURAL SB was obtained.

Preparation of Aluminium-Hydroxide Suspensions
Boehmite Suspension Type 2

24.0 g of commercially available PURAL SB ($Al_2O_3$ content 75.1%) were added to 376 g of water and stirred externally for 10 minutes.

Example B3

Preparation of Aluminium-Hydroxide Suspensions
Boehmite Suspension Type 3 (La-doped)

17.9 g of commercially available DISPERAL HP 14 ($Al_2O_3$ content 79.6%) were added to 382.1 g of water and stirred externally for 10 minutes. 9.6 g of a La-acetate solution ($La_2O_3$ content 7.01%) were added to this suspension and the resulting mixture was stirred for 30 minutes.

Example B4

Preparation of Aluminium-Hydroxide Suspensions
Boehmite Suspension Type 4 (La-doped)

23.25 g of commercially available DISPERAL HP 8 ($Al_2O_3$ content 77.4%) were added to 376.75 g of water and stirred externally for 10 minutes. 10.8 g of a La-acetate solution ($La_2O_3$ content 7.01%) were added to this suspension and the resulting mixture was stirred for 30 minutes.

Preparation of Al-, Ce- and Zr-oxides According to the Present Invention

Example 1

$CeO_2$(14.5%) $ZrO_2$(31%) $La_2O_3$(4.5%) $Al_2O_3$(50%)/TO 103.31 g of Wet Cake A, obtained according to Example A1, were suspended in 200 mL of deionised water and the mixture obtained was stirred using an external stirrer (Ultra-turax) for 15 minutes. The pH of the mixture obtained was adjusted to 9.5 using 24% aqueous ammonia solution and the mixture obtained was stirred for a further 30 minutes. The aqueous slurry 2 obtained was filtered and the solid obtained was impregnated with 35.53 g of Triton X-100®. The impregnated solid obtained was added to 555.56 g of Boehmite Suspension Type 1 ($Al_2O_3$ content=4.5%). The aqueous suspension obtained was stirred vigorously using an external stirrer for 30 minutes, was filtered and the solid obtained was dried at 120° C. overnight. The solid composition obtained was calcined at 850° C./4 hours. Approximately 50 g of $CeO_2$(14.5%) $ZrO_2$(31%) $La_2O_3$(4.5%) $Al_2O_3$(50%) were obtained.

BET after 850° C./4 hours (Fresh material): 76 m$^2$/g
BET after 1000° C./4 hours: 56.4 m$^2$/g
BET after 1100° C./2 hours: 49.3 m$^2$/g
BET after 1100° C./20 hours: 45.1 m$^2$/g Example 2

$CeO_2$(14.5%) $ZrO_2$(31%) $La_2O_3$(4.5%) $Al_2O_3$(50%)/TO 103.31 g of Wet Cake A, obtained according to Example A1, was suspended in 200 mL of deionised water and the mixture obtained was stirred using an external stirrer (Ultra-turax) for 15 minutes. The pH of the mixture obtained was adjusted to 9.5 using 24% ammonia solution and the mixture obtained was stirred for a further 30 minutes. To the mixture obtained 20.29 g of lauric acid were added and the mixture obtained was stirred for another 30 minutes. The aqueous slurry 2 obtained was added to 555.56 g of Boehmite Suspension Type 1 ($Al_2O_3$ content=4.5%). The aqueous suspension obtained was stirred vigorously using an external stirrer for 30 minutes, filtered and the solid obtained was dried at 120° C. overnight. The solid composition obtained was calcined at 850° C./4 hours. Approximately 50 g of $CeO_2$(14.5%) $ZrO_2$(31%) $La_2O_3$(4.5%) $Al_2O_3$(50%) were obtained.

BET after 850° C./4 hours (Fresh material): 91 m$^2$/g
BET after 1000° C./4 hours: 62 m$^2$/g
BET after 1100° C./2 hours: 54 m$^2$/g
BET after 1100° C./20 hours: 47 m$^2$/g Example 3

$CeO_2$(14.5%) $ZrO_2$(31%) $La_2O_3$(4.5%) $Al_2O_3$(50%)/TO 63.92 g of an aqueous solution of zirconium nitrate ($ZrO_2$ content=24.25%), 25.44 g of an aqueous solution of cerium nitrate ($CeO_2$ content=28.5%) and 5.97 g of lanthanum nitrate in the form of crystals ($La_2O_3$ content=37.7%) were treated with 230 mL of deionised water, the mixture obtained was stirred for a few minutes and a clear solution was obtained. To the mixture obtained 48.15 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH value of 9.5 was adjusted. The aqueous slurry 1 obtained was added to 555.56 g of Boehmite Suspension Type 1 ($Al_2O_3$ content=4.5%) and the aqueous suspension obtained was vigorously stirred using an external stirrer. To the mixture obtained 15.9 g of Triton X-100® were added, the suspension obtained was stirred for another 30 minutes and filtered. The solid obtained was dried at 120° C. overnight to obtain a solid composition which was calcined at 850° C./4 hours. 50 g of $CeO_2$(14.5%) $ZrO_2$(31%) $La_2O_3$(4.5%) $Al_2O_3$(50%) were obtained.

BET after 850° C./4 hours (Fresh material): 87 m$^2$/g
BET after 1000° C./4 hours: 77 m$^2$/g
BET after 1100° C./2 hours: 59 m$^2$/g
BET after 1100° C./20 hours: 47 m$^2$/g

Example 4

$CeO_2(10\%)$ $ZrO_2(36.5\%)$ $La_2O_3(1\%)$ $Nd_2O_3(2.5\%)$ $Al_2O_3$ (50%)/TO 123.73 g of an aqueous solution of zirconium nitrate ($ZrO_2$ content=29.5%), 35.09 g of an aqueous solution of cerium nitrate ($CeO_2$ content=28.5%) 2.65 g of lanthanum nitrate in the form of crystals ($La_2O_3$ 37.7%) and 6.54 g of neodymium nitrate in the form of crystals ($Nd_2O_3$ 38.2%) were treated with 475 mL of deionised water, the mixture obtained was stirred for a few minutes and a clear solution was obtained. To the mixture obtained 95.5 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH=9.5 was adjusted. A precipitate formed and the aqueous slurry 1 obtained was filtered. A solid was obtained, was washed with deionised water and was impregnated with 32.8 g of Triton X-100 by washing the precipitate with 15% solution of Triton X-100® in deionised water. The impregnated solid obtained was suspended in deionised water and the aqueous slurry 2 obtained was mixed with 1111.1 g of Boehmite Suspension Type 1 ($Al_2O_3$ content=4.5%). The aqueous suspension obtained was vigorously stirred using an external stirrer for 2 hours, filtered, and the solid obtained was dried at 120° C. overnight (approximately 20 hours). The solid composition obtained was calcined at 850° C./4 hours. 100 g of $CeO_2(10\%)$ $ZrO_2(36.5\%)$ $La_2O_3(1\%)$ $Nd_2O_3(2.5\%)$ $Al_2O_3(50\%)$ were obtained.

BET after 850° C./4 hours (Fresh material): 99 m$^2$/g
BET after 1000° C./4 hours: 87 m$^2$/g
BET after 1100° C./2 hours: 65 m$^2$/g
BET after 1100° C./20 hours: 53 m$^2$/g

Example 5

$CeO_2(10\%)$ $ZrO_2(36.5\%)$ $La_2O_3(1\%)$ $Nd_2O_3(2.5\%)$ $Al_2O_3$ (50%)/TO 75.2 g of an aqueous solution of zirconium nitrate ($ZrO_2$ content=24.3%), 35.09 g of an aqueous solution of cerium nitrate ($CeO_2$ content=28.5%) 2.65 g of lanthanum nitrate in the form of crystals ($La_2O_3$ 37.7%) and 6.54 g of neodymium nitrate in the form of crystals ($Nd_2O_3$ 38.%) were treated with 475 mL of deionised water, the mixture obtained was stirred for a few minutes and a clear solution was obtained. To the mixture obtained 95.5 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH=9.5 was adjusted. A precipitate formed and the aqueous slurry 1 obtained was filtered. The solid obtained was washed with deionised water and was impregnated with 15 g of Tergitol 15-S-9®. The impregnated solid obtained was suspended in deionised water and the aqueous slurry 2 obtained was mixed with 555.56 g of Boehmite Suspension Type 1 ($Al_2O_3$ content=4.5%). The aqueous suspension obtained was vigorously stirred using an external stirrer for 2 hours and was filtered. The solid obtained was dried at 120° C. overnight (approximately 20 hours). The solid composition obtained was calcined at 850° C./4 hours to obtain 50 g of $CeO_2(10\%)$ $ZrO_2(36.5\%)$ $La_2O_3(1\%)$ $Nd_2O_3(2.5\%)$ $Al_2O_3(50\%)$.

BET after 850° C./4 hours (Fresh material): 92.5 m$^2$/g
BET after 1000° C./4 hours: 71 m$^2$/g
BET after 1100° C./2 hours: 57 m$^2$/g
BET after 1100° C./20 hours: 51 m$^2$/g

Example 6

$CeO_2(10\%)$ $ZrO_2(36.5\%)$ $La_2O_3(1\%)$ $Nd_2O_3(2.5\%)$ $Al_2O_3$ (50%)/TO 150.52 g of an aqueous solution of zirconium nitrate ($ZrO_2$ content=24.25%), 35.09 g of an aqueous solution of cerium nitrate ($CeO_2$ content=28.5%) 2.65 g of lanthanum nitrate in the form of crystals ($La_2O_3$ 37.7%) and 6.54 g of neodymium nitrate in the form of crystals ($Nd_2O_3$ 38.2%) were treated with 574 mL of deionised water, the mixture obtained was stirred for a few minutes and a clear solution was obtained. To the mixture obtained 95.5 mL of cooled (10° C.) 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH=9.5 was adjusted. To the mixture obtained 18.8 g of lauric acid were added and the mixture obtained was stirred for 1 hour. A precipitate formed and the aqueous slurry 1 obtained was filtered. The solid thus obtained was washed with deionised water, suspended in deionised water and mixed with 1111.11 g of Boehmite Suspension Type 1 ($Al_2O_3$ content=4.5%). The aqueous suspension obtained was vigorously stirred using an external stirrer for 2 hours and filtered. The solid obtained was dried at 120° C. overnight. The solid composition obtained was calcined at 850° C./4 hours. 100 g of $CeO_2(10\%)$ $ZrO_2(36.5\%)$ $La_2O_3(1\%)$ $Nd_2O_3(2.5\%)$ $Al_2O_3(50\%)$ were obtained.

BET after 850° C./4 hours (fresh material): 110 m$^2$/g
BET after 1000° C./4 hours: 90 m$^2$/g
BET after 1100° C./2 hours: 64 m$^2$/g
BET after 1100° C./20 hours: 53 m$^2$/g

Example 7

$CeO_2(10\%)$ $ZrO_2(36.5\%)$ $La_2O_3(1\%)$ $Nd_2O_3(2.5\%)$ $Al_2O_3$ (50%)/TO 139.66 g of Wet Cake B, obtained according to Example A2 (ROI 18%) were suspended in 200 mL of deionised water, the aqueous slurry 2 obtained was stirred using an external stirrer (Ultraturex) for 10 minutes and was mixed with 543.5 g of Boehemite Suspension Type 1 ($Al_2O_3$ content 4.6%). The aqueous suspension obtained was stirred for 2 hours at rt and filtered. The solid obtained was dried at 120° C. overnight and the solid composition obtained was calcined at 850° C./4 hours. Approximately 50 g of $CeO_2$ (10%) $ZrO_2(36.5\%)$ $La_2O_3(1\%)$ $Nd_2O_3(2.5\%)$ $Al_2O_3(50\%)$ were obtained.

BET after 850° C./4 hours (Fresh material): 96 m$^2$/g
BET after 1000° C./4 hours: 64 m$^2$/g
BET after 1100° C./4 hours: 53 m$^2$/g
BET after 1100° C./20 hours: 42 m$^2$/g

Example 8

$CeO_2(10\%)$ $ZrO_2(36.5\%)$ $La_2O_3(1\%)$ $Nd_2O_3(2.5\%)$ $Al_2O_3$ (50%)/TO 146.1 g of Wet Cake B, obtained according to Example A2 (ROI 18%) were suspended in 300 mL of deionised water, the mixture obtained was stirred using an external stirrer (Ultraturex) for 10 minutes and 16.6 g of Triton X-100® were added. The aqueous slurry 2 obtained was stirred for 2 hours, mixed with 610 g of Boehmite Suspension Type 1 ($Al_2O_3$ content 4.1%) and stirred for 2 hours. The aqueous suspension obtained was spray-dried (inlet temperature: 220° C., outlet-temperature: 110° C.). The solid composition obtained was calcined at 850° C./4 hours.

Approximately 50 g of $CeO_2(10\%)$ $ZrO_2(36.5\%)$ $La_2O_3$ (1%) $Nd_2O_3(2.5\%)$ $Al_2O_3(50\%)$ were obtained.

BET after 850° C./4 hours (Fresh material): 83 m²/g
BET after 1000° C./4 hours: 66 m²/g
BET after 1100° C./4 hours: 52 m²/g
BET after 1100° C./24 hours: 47 m²/g Example 9

$CeO_2(10\%)$ $ZrO_2(36.5\%)$ $La_2O_3(1\%)$ $Nd_2O_3(2.5\%)$ $Al_2O_3$ (50%)/TO 136.1 g of Wet Cake B, obtained according to Example A2 (ROI 17.4%) were suspended in 300 mL of deionised water, the aqueous slurry 2 obtained was stirred using an external stirrer (Ultraturex) for 10 minutes and the mixture obtained was mixed with 610 g of Boehemite Suspension Type 1 ($Al_2O_3$ content 4.1%). The aqueous suspension obtained was stirred for 2 hours at rt and was spray-dried (inlet temperature: 220° C., outlet-temperature: 110° C.). The solid composition obtained was calcined at 850° C./4 hours. Approximately 50 g of $CeO_2(10\%)$ $ZrO_2(36.5\%)$ $La_2O_3(1\%)$ $Nd_2O_3(2.5\%)$ $Al_2O_3(50\%)$ were obtained.

BET after 850° C./4 hours (Fresh material): 63 m²/g
BET after 1000° C./4 hours: 60 m²/g
BET after 1100° C./4 hours: 50 m²/g
BET after 1100° C./24 hours: 44 m²/g Example 10

$CeO_2(13\%)$ $ZrO_2(47.5\%)$ $La_2O_3(1.3\%)$ $Nd_2O_3(3.25\%)$ $Al_2O_3(35\%)$/TO 195.67 g of an aqueous solution of zirconium nitrate ($ZrO_2$ content=24.25%), 45.61 g of an aqueous solution of cerium nitrate ($CeO_2$ content=28.5%), 3.45 g of lanthanum nitrate in crystal form ($La_2O_3$ content=37.7%) and 8.51 g of neodymium nitrate in crystal form ($Nd_2O_3$ content=38.2%) were treated with 574 mL of deionised water, the mixture obtained was stirred for a few minutes and a clear solution was obtained. To the mixture obtained 129.3 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until the pH was adjusted to 9.5. To the mixture obtained 24.4 g of lauric acid were added, the aqueous slurry 1 obtained was stirred for 1 hour, filtered and the solid obtained was washed with deionised water. The solid obtained was suspended in deionised water and the aqueous slurry 2 thus obtained was mixed with 1111.11 g of Boehmite Suspension Type 1 ($Al_2O_3$ content=4.5%). The mixture obtained was vigorously stirred using an external stirrer for 2 hours, filtered, and the solid obtained was dried at 120° C. overnight and calcined at 850° C./4 hours. 100 g of $CeO_2$ (13%) $ZrO_2(47.5\%)$ $La_2O_3(1.3\%)$ $Nd_2O_3(3.25\%)$ $Al_2O_3$ (35%) were obtained.

BET after 850° C./4 hours (Fresh material): 84 m²/g
BET after 1000° C./4 hours: 73 m²/g
BET after 1100° C./2 hours: 49 m²/g
BET after 1100° C./20 hours: 42 m²/g Example 11

$CeO_2(7\%)$ $ZrO_2(25.55\%)$ $La_2O_3(0.7\%)$ $Nd_2O_3(1.75\%)$ $Al_2O_3(65\%)$ 86.61 g of an aqueous solution of zirconium nitrate ($ZrO_2$ content=29.5%), 24.56 g of an aqueous solution of cerium nitrate ($CeO_2$ content=28.5%) 1.86 g of lanthanum nitrate in the form of crystals ($La_2O_3$ 37.7%) and 4.58 g of neodymium nitrate in the form of crystals ($Nd_2O_3$ 38.2%) were treated with 200 mL of deionised water, the mixture obtained was stirred for a few minutes and a clear solution was obtained. To the mixture obtained 66.85 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH=9.5 was adjusted. A precipitate formed and the aqueous slurry 1 obtained was filtered. The solid obtained was washed with deionised water and was impregnated with 23.01 g of Triton X-100® by washing the precipitate with an aqueous 15% solution of Triton X-100® in deionised water. The impregnated solid obtained was suspended in deionised water and the aqueous slurry 2 obtained was mixed with 1444.4 g of Boehmite Suspension Type 1 ($Al_2O_3$ content=4.5%). The aqueous suspension obtained was vigorously stirred using an external stirrer for 2 hours and filtered. The solid obtained was dried at 120° C. overnight (approx. 20 hours) and the solid composition obtained was calcined at 850° C./4 hours. 100 g of $CeO_2$ (7%) $ZrO_2(25.55\%)$ $La_2O_3(0.7\%)$ $Nd_2O_3(1.75\%)$ $Al_2O_3$ (65%) were obtained.

BET after 850° C./4 hours (fresh material): 106 m²/g
BET after 1000° C./4 hours: 99 m²/g
BET after 1100° C./2 hours: 76 m²/g
BET after 1100° C./20 hours: 65 m²/g Example 12

$CeO_2(7\%)$ $ZrO_2(25.55\%)$ $La_2O_3(0.7\%)$ $Nd_2O_3(1.75\%)$ $Al_2O_3(65\%)$ 105.36 g of an aqueous solution of zirconium nitrate ($ZrO_2$ content=24.25%), 24.56 g of an aqueous solution of cerium nitrate ($CeO_2$ content=28.5%), 1.68 g of lanthanum nitrate in crystal form ($La_2O_3$ content=37.7%) and 4.58 g of neodymium nitrate in crystal form ($Nd_2O_3$ content=38.2%) were treated with 200 mL of deionised water, the mixture obtained was stirred for a few minutes and the solution became clear. To the mixture obtained 66.8 mL of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until the pH was adjusted to 9.5. To the suspension obtained 13.14 g of lauric acid were added, the aqueous slurry 1 obtained was stirred for 1 hour, filtered and the Wet Cake 12/I obtained was washed with deionised water. Wet Cake 12/I obtained was suspended in deionised water to give an aqueous slurry 2 which was mixed with 1111.11 g of Boehmite Suspension Type 1 ($Al_2O_3$ content=4.5%). The aqueous suspension obtained was vigorously stirred using an external stirrer for 2 hours and was filtered. The solid obtained was dried at 120° C. overnight and the solid composition obtained was calcined at 850° C./4 hours. 100 g of $CeO_2(7\%)$ $ZrO_2(25.55\%)$ $La_2O_3(0.7\%)$ $Nd_2O_3(1.75\%)$ $Al_2O_3(65\%)$ were obtained.

BET after 850° C./4 hours (Fresh material): 99 m²/g
BET after 1000° C./4 hours: 88 m²/g
BET after 1100° C./2 hours: 74 m²/g
BET after 1100° C./20 hours: 63 m²/g

Example 13

$CeO_2(24.1\%)$ $ZrO_2(17.3\%)$ $La_2O_3(0.5\%)$ $Y_2O_3(0.9\%)$ $Al_2O_3(57.2)$ 71.34 g of an aqueous solution of zirconium nitrate ($ZrO_2$ content=24.25%), 84.56 g of an aqueous solution of cerium nitrate ($CeO_2$ content=28.5%), 1.33 g of lanthanum nitrate in crystal form ($La_2O_3$ content=37.7%) and 2.94 g of yttrium nitrate in crystal form ($Y_2O_3$ content=38.2%) were dissolved in 300 mL of deionised water, the mixture obtained was stirred for a few minutes and a clear solution was obtained. To the mixture obtained 75.1 ml of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH=9.5 was adjusted. The aqueous slurry 1 obtained was filtered, the solid obtained was washed with deionised water and was impregnated with 25.5 g Triton X-100®. The impregnated solid obtained was suspended in deionised water and the aqueous slurry 2 obtained was mixed with 1271.11 g of Boehmite Suspension Type 1 ($Al_2O_3$ content=4.5%). The aqueous suspension obtained was vigorously stirred using an external stirrer for 2 hours and filtered. The solid obtained was dried at 120° C. overnight and the solid composition obtained was calcined at 850° C./4 hours. 100 g of $CeO_2(24.1\%)$ $ZrO_2(17.3\%)$ $La_2O_3(0.5\%)$ $Y_2O_3(0.9\%)$ $Al_2O_3(57.2)$ were obtained.

BET after 850° C./4 hours (Fresh material): 94 m²/g
BET after 1000° C./4 hours: 82 m²/g
BET after 1100° C./2 hours: 68 m²/g
BET after 1100° C./20 hours: 56 m²/g The composition of the composite material obtained according to Example 13 corresponds exactly to the composition disclosed in example 24 of EP 1 172 139. For the composition obtained according to example 24 of EP 1 172 139, however, the following BET values are reported in EP 1 172 139:

BET after 1000° C./4 hours: 55 m²/g
BET after 1100° C./20 hours: 27 m²/g

From the above it is evident that the BET values of the composition surprisingly are much higher when prepared according to the process of the present invention than the BET values of the composition when prepared according to prior art processes.

Example 14

$CeO_2(24.1\%)$ $ZrO_2(17.3\%)$ $La_2O_3(0.5\%)$ $Y_2O_3(0.9\%)$ $Al_2O_3(57.2)$ 71.34 g of an aqueous solution of zirconium nitrate ($ZrO_2$ content=24.25%), 84.56 g of an aqueous solution of cerium nitrate ($CeO_2$ content=28.5%), 1.33 g of lanthanum nitrate in crystal form ($La_2O_3$ content=37.7%) and 2.94 g of yttrium nitrate in crystal form ($Y_2O_3$ content=38.2%) were treated with 300 mL of deionised water, the mixture obtained was stirred for a few minutes and a clear solution was obtained. To the mixture obtained 75.1 ml of cooled (10° C.) aqueous 35% $H_2O_2$ were added and the mixture obtained was stirred for approximately 45 minutes. An aqueous 24% ammonia solution (cooled to 10° C.) was added dropwise to the mixture with a dropping rate of 40 mL/minute until a pH value of 9.5 was adjusted. A precipitate formed and the aqueous slurry 1 obtained was filtered. The solid obtained was washed with deionised water and was impregnated with 25.5 g Triton X-100®. The impregnated solid obtained was suspended in deionised water and the aqueous slurry 2 obtained was mixed with 1271.11 g of Boehmite Suspension Type 1 ($Al_2O_4$ content=4.5%). The aqueous suspension obtained was vigorously stirred using an external stirrer for 2 hours and spray dried. The solid composition obtained was calcined at 850° C./4 hours. 100 g of $CeO_2(24.1\%)$ $ZrO_2(17.3\%)$ $La_2O_3(0.5\%)$ $Y_2O_3(0.9\%)$ $Al_2O_3(57.2)$ were obtained.

BET after 850° C./4 hours (fresh material): 90 m²/g
BET after 1000° C./4 hours: 78 m²/g
BET after 1100° C./2 hours: 58 m²/g
BET after 1100° C./20 hours: 50 m²/g The composition of the composite material obtained according to Example 14 corresponds exactly to the composition disclosed in example 24 of EP 1 172 139. For the composition obtained according to example 24 of EP 1 172 139, however, the following BET values are reported in EP 1 172 139:

BET after 1000° C./4 hours: 55 m²/g
BET after 1100° C./20 hours: 27 m²/g

From the above it is evident that the BET values of the compositions surprisingly are much higher when prepared according to the present invention than the BET values of the composition when prepared according to prior art.

Example 15

$CeO_2(30\%)$ $ZrO_2(15\%)$ $La_2O_3(1.5\%)$ $Pr_6O_{11}(3.5\%)$ $Al_2O_3(50\%)$ 61.86 g of an aqueous solution of zirconium nitrate ($ZrO_2$ content=24.25%), 105.26 g of an aqueous solution of cerium nitrate ($CeO_2$ content=28.5%), 3.98 g of lanthanum nitrate in crystal form ($La_2O_3$ content=37.7%) and 8.97 g of praseodymium nitrate in crystal form ($Pr_6O_{11}$ content=39.02%) were treated with 460 mL of deionised water, the mixture obtained was stirred for a few minutes and a clear solution was obtained. To the mixture obtained 86.36 ml of cooled (10° C.) aqueous 35% $H_2O_2$ were added and the mixture obtained was stirred for approximately 45 minutes. To the mixture obtained an aqueous 24% ammonia solution (cooled to 10° C.) was added dropwise with a dropping rate of 40 mL/minute until a pH value of 9.5 was adjusted. The aqueous slurry 1 obtained was filtered, the solid obtained was washed with deionised water and was impregnated with 28.54 g of Triton X-100® The impregnated solid obtained was suspended in deionised water to give aqueous slurry 2 and was mixed with 1111.11 g of Boehmite Suspension Type 1 ($Al_2O_3$ content=4.5%). The aqueous suspension obtained was vigorously stirred using an external stirrer for 2 hours and filtered. The solid obtained was dried at 120° C. overnight and the solid composition obtained was calcined at 850° C./4 hours. 100 g of $CeO_2(30\%)$ $ZrO_2(15\%)$ $La_2O_3(1.5\%)$ $Pr_6O_{11}(3.5\%)$ $Al_2O_3(50\%)$ were obtained.

BET after 850° C./4 hours (fresh material): 89 m²/g
BET after 1000° C./4 hours: 75 m²/g
BET after 1100° C./2 hours: 59 m²/g
BET after 1100° C./20 hours: 50 m²/g

Example 16

$CeO_2(10\%)$ $ZrO_2(36.5\%)$ $La_2O_3(1\%)$ $Nd_2O_3(2.5\%)$ $[Al_2O_3:La](50\%)$ 137.36 g of Wet Cake B, obtained according to example A2 (ROI 18%) were suspended in 150 mL of deionised water and stirred using an external stirrer (Ultraturex) for 10 minutes. To the suspension obtained 16.4 g of Triton X-100® were added and the mixture obtained was stirred for 2 hours. The suspension obtained was mixed with 629.72 g of La-doped Boehmite Suspension Type 3 ($Al_2O_3$ content 3.97%). The slurry obtained was stirred for 2 hours at rt and filtered. The solid obtained was dried at 120° C. overnight and calcined at 850° C./4 hours. 50 g of $CeO_2$(10%) $ZrO_2$(36.5%) $La_2O_3$(1%) $Nd_2O_3$(2.5%) [$Al_2O_3$:La](50%) were obtained.

BET after 850° C./4 hours (fresh material): 74 $m^2/g$
BET after 1000° C./4 hours: 55 $m^2/g$
BET after 1100° C./4 hours: 46 $m^2/g$
BET after 1100° C./20 hours: 44 $m^2/g$
BET after 1150° C./36 hours: 34 $m^2/g$
BET after 1200° C./4 hours: 33 $m^2/g$ Example 17

$CeO_2$(10%) $ZrO_2$(36.5%) $La_2O_3$(1%) $Nd_2O_3$(2.5%) [$Al_2O_3$:La](50%)

137.36 g of Wet Cake B, obtained according to example A2 (ROI 18%) were suspended in 150 mL of deionised water, the aqueous slurry 2 obtained was stirred using an external stirrer (Ultraturex) for 10 minutes and was mixed with 629.72 g of La-doped Boehmite Suspension Type 3 ($Al_2O_3$ content 3.97%). The aqueous suspension obtained was stirred for 2 hours at rt and filtered. The solid obtained was dried at 120° C. overnight and the solid composition obtained was calcined at 850° C./4 hours. Approximately 50 g of $CeO_2$ (10%) $ZrO_2$ (36.5%) $La_2O_3$ (1%) $Nd_2O_3$(2.5%) [$Al_2O_3$:La](50%) were obtained.

BET after 850° C./4 hours (fresh material): 73 $m^2/g$
BET after 1000° C./4 hours: 54 $m^2/g$
BET after 1100° C./4 hours: 44 $m^2/g$
BET after 1100° C./20 hours: 40 $m^2/g$
BET after 1150° C./36 hours: 30 $m^2/g$
BET after 1200° C./4 hours: 30 $m^2/g$ Example 18

$CeO_2$(10%) $ZrO_2$(36.5%) $La_2O_3$(1%) $Nd_2O_3$(2.5%) [$Al_2O_3$:La](50%)

137.36 g of Wet Cake B, obtained according to example A2 (ROI 18%), were suspended in 150 mL of deionised water, the mixture obtained was stirred using an external stirrer (Ultraturex) for 10 minutes and 16.4 g of Triton X-100® were added. The aqueous slurry 2 obtained was stirred for 2 hours, mixed with 553.1 g of La-doped Boehmite Suspension Type 4 ($Al_2O_3$ content 4.52%) and the aqueous suspension obtained was stirred for 2 hours at rt and filtered. The solid obtained was dried at 120° C. overnight and the solid composition obtained was calcined at 850° C./4 hours. Approximately 50 g of $CeO_2$(10%) $ZrO_2$(36.5%) $La_2O_3$(1%) $Nd_2O_3$(2.5%) [$Al_2O_3$:La](50%) were obtained.

BET after 850° C./4 hours (fresh material): 90 $m^2/g$
BET after 1000° C./4 hours: 67 $m^2/g$
BET after 1100° C./4 hours: 49 $m^2/g$
BET after 1100° C./20 hours: 45 $m^2/g$
BET after 1150° C./36 hours: 35 $m^2/g$
BET after 1200° C./4 hours: 30 $m^2/g$ Example 19

$CeO_2$(10%), $ZrO_2$(36.5%) $La_2O_3$(1%) $Nd_2O_3$(2.5%) [$Al_2O_3$:La](50%)

137.36 g of Wet Cake B, obtained according to Example A2 (ROI 18%) were suspended in 150 mL of deionised water and the aqueous slurry 2 obtained was stirred using an external stirrer (Ultraturex) for 10 minutes. The suspension obtained was mixed with 553.1 g of La-doped Boehmite Suspension Type 4 ($Al_2O_3$ content 4.52%). The aqueous suspension obtained was stirred for 2 hours at rt and filtered. The solid obtained was dried at 120° C. overnight and the solid composition obtained was calcined at 850° C./4 hours. Approximately 50 g of $CeO_2$(10%) $ZrO_2$(36.5%) $La_2O_3$ (1%) $Nd_2O_3$(2.5%) [$Al_2O_3$:La](50%) were obtained.

BET after 850° C./4 hours (fresh material): 86 $m^2/g$
BET after 1000° C./4 hours: 66 $m^2/g$
BET after 1100° C./4 hours: 48 $m^2/g$
BET after 1100° C./20 hours: 42 $m^2/g$
BET after 1150° C./36 hours: 33 $m^2/g$
BET after 1200° C./4 hours: 29 $m^2/g$ Example 20

$CeO_2$(28.15%) $ZrO_2$(20.21%) $La_2O_3$(0.58%) $Y_2O_3$(1.05%) [$Al_2O_3$:La](50%)

110.62 g of Wet Cake C, obtained according to example A3 (ROI 18%) were suspended in 150 mL of deionised water and the mixture obtained was stirred using an external stirrer (Ultraturex) for 10 minutes. To the suspension obtained 16.4 g of Triton X-100 were added and the mixture obtained was stirred for 2 hours. The aqueous slurry 1 obtained was mixed with 629.72 g of La-doped Boehmite Type 3 ($Al_2O_3$ content 3.97%). The aqueous suspension obtained was stirred for 2 hours at rt, filtered and the solid obtained was dried at 120° C. overnight. The solid composition obtained was calcined at 850° C./4 hours. Approximately 50 g of $CeO_2$(28.15%) $ZrO_2$(20.21%) $La_2O_3$(0.58%) $Y_2O_3$(1.05%) [$Al_2O_3$:La](50%) were obtained.

BET after 850° C./4 hours (fresh material): 73 $m^2/g$
BET after 1000° C./4 hours: 68 $m^2/g$
BET after 1100° C./4 hours: 48 $m^2/g$
BET after 1100° C./20 hours: 44 $m^2/g$
BET after 1150° C./36 hours: 36 $m^2/g$
BET after 1200° C./4 hours: 35 $m^2/g$ Example 21

$CeO_2$(28.15%) $ZrO_2$(20.21%) $La_2O_3$(0.58%) $Y_2O_3$(1.05%) [$Al_2O_3$:La](50%)

110.62 g of Wet Cake C, obtained according to example A3 (ROI 22.6%) were suspended in 150 mL of deionised water, the aqueous slurry 2 obtained was stirred using an external stirrer (Ultraturex) for 10 minutes and the suspension obtained was mixed with 629.72 g of La-doped Boehmite Suspension Type 3 ($Al_2O_3$ content 3.97%). The aqueous suspension obtained was stirred for 2 hours at rt, filtered, and the solid obtained was dried at 120° C. overnight. The solid composition obtained was calcined at 850° C./4 hours. Approximately 50 g of $CeO_2$(28.15%) $ZrO_2$(20.21%) $La_2O_3$ (0.58%) $Y_2O_3$(1.05%) [$Al_2O_3$:La](50%) were obtained.

BET after 850° C./4 hours (fresh material): 71 $m^2/g$
BET after 1000° C./4 hours: 56 $m^2/g$
BET after 1100° C./4 hours: 48 $m^2/g$
BET after 1100° C./20 hours: 42 $m^2/g$
BET after 1150° C./36 hours: 35 $m^2/g$
BET after 1200° C./4 hours: 34 $m^2/g$ Comparative Examples Comparative Example 1

$CeO_2$(10%) $ZrO_2$(36.5%) $La_2O_3$(1%) $Nd_2O_3$(2.5%) $Al_2O_3$(50%)

Preparation According to the Process Disclosed in Example 1 of EP 1 172 139

92.8 g of an aqueous solution of zirconium nitrate ($ZrO_2$ content=29.5%), 26.32 g of an aqueous solution of cerium nitrate (CeO$_2$ content=28.5%), 1.99 g of lanthanum nitrate in crystal form (La$_2$O$_3$ content=37.7%), 4.91 g of neodymium nitrate in crystal form (Nd$_2$O$_3$ content=38.2%) and 275.74 g of aluminium nitrate nonahydrate (Al$_2$O$_3$ content=13.6%) were treated with 600 mL of deionised water, the mixture obtained was stirred for a few minutes and a clear solution was obtained. To the mixture obtained 4.62 mL of aqueous 35% H$_2$O$_2$ (1.2 molar ratio of cerium) were added and the mixture obtained was stirred for approximately 20 minutes. To the mixture obtained aqueous 24% ammonia solution was added in a short period of time until a pH=7 was adjusted. The mixture obtained was stirred for 15 minutes. The mixture obtained was filtered and the precipitate obtained was washed with deionised water. The Wet Cake 1$_{COMP}$ obtained was dried at 120° C. and calcined at 300° C./5 hours and afterwards burned at 700° C./5 hours. 75 g of CeO$_2$(10%) ZrO$_2$(36.5%) La$_2$O$_3$(1%) Nd$_2$O$_3$(2.5%) Al$_2$O$_3$ (50%) were obtained.

BET after 300° C./5 hours+700° C./5 hours (fresh material): 148 m$^2$/g
BET after 950° C./5 hours: 101 m$^2$/g
BET after 1000° C./4 hours: 92 m$^2$/g
BET after 1100° C./2 hours: 47 m$^2$/g
BET after 1100° C./20 hours: 31 m$^2$/g Comparative Example 2

CeO$_2$(28%) ZrO$_2$(15%) Pr$_6$O$_{11}$(3.5%) Fe$_2$O$_3$(3.5%) [Al$_2$O$_3$:La](50%)

Preparation According to Example 1 of U.S. Pat. No. 5,883,037

The title composition corresponds to a composition of 50% Al$_2$O$_3$/La$_2$O$_3$ (97%/3%) and 50% CeO$_2$/ZrO$_2$/Pr$_6$O$_{11}$/Fe$_2$O$_3$ (56%/30%/7%/7%). 78.33 g of cerium acetate (CeO$_2$ content=47.9%), 90.13 g of zirconium acetate (ZrO$_2$ content=22.3%), 9.79 g of praseodymium acetate (Pr$_6$O$_{11}$ content=47.9%) and 34.77 g ferric nitrate (Fe$_2$O$_3$ content=13.49%) were dissolved in 1350 mL deionised water to yield a mixed metal solution. In a 4 L beaker approximately 500 g of 24% ammonia were diluted to a total volume of 2600 mL. Under vigorous stirring the mixed metal solution obtained was added to the ammonia solution obtained and a final pH of 10 was noted. To the mixture obtained 784.54 g of a slurry containing lanthanum doped alumina (Al$_2$O$_3$ content=8.54%) were added under vigorous stirring and the volume of the mixture obtained was raised to 4 L. The mixture obtained was filtered and the Wet Cake 2$_{COMP}$ obtained was dried at 110° C. and calcined at 600° C./2 hours. 134 g of CeO$_2$(28%) ZrO$_2$(15%) Pr6O$_{11}$(3.5%) Fe$_2$O$_3$(3.5%) [Al$_2$O$_3$:La](50%) were obtained. BET was measured at different ageing temperatures.

BET after 850° C./4 hours (Fresh material): 55 m$^2$/g
BET after 1000° C./4 hours: 43 m$^2$/g
BET after 1100° C./4 hours: 27 m$^2$/g
BET after 1150° C./36 hours: 5 m$^2$/g
BET after 1200° C./4 hours: 7 m$^2$/g Comparative Example 3

CeO$_2$(14.2%) ZrO$_2$(34.8%), Al$_2$O$_3$(51%)

Preparation According to Example 6 of WO 2006/070201

To 112.5 g of aluminium nitrate nonahydrate (Al$_2$O$_3$ content=13.6%) dissolved in 1.5 L of deionised water 14.77 g of an aqueous solution of cerium nitrate (CeO$_2$ content=28.85%) and 43.02 g of an aqueous solution of zirconium nitrate (ZrO$_2$ content=24.27%) were added. The mixture obtained was stirred for 15 minutes. To the mixture obtained a 25% aqueous solution of NaOH were added whereupon a precipitate formed. The pH value was kept close to 10 during precipitation. To the slurry obtained 5 g of H$_2$O$_2$ were added and the pH of the mixture obtained was adjusted to 10. The mixture obtained was stirred for 1 hour and the pH of the mixture obtained was adjusted to 8 using 30% nitric acid. The slurry obtained was maintained at 60° C. for 1 hour. The mixture obtained was filtered and the solid obtained was washed with deionized water at 60° C. until the electrical conductivity of the filtrate was less than 0.5 S·m$^{-1}$. The Wet Cake 3$_{COMP}$ obtained was isolated and resuspended in 850 mL of water, the pH of the slurry obtained was adjusted to 10 and the mixture obtained was autoclaved at 120° C. for 6 hours. The slurry obtained was cooled down and the pH of the mixture obtained was adjusted to 8 using 30% nitric acid. The mixture obtained was stirred for 30 minutes. The slurry obtained was maintained at 60° C. for 1 hour and filtered. The solid obtained was washed with deionised water and directly calcined at 850° C. BET was measured at different ageing temperatures.

BET after 850° C./4 hours (Fresh material): 107 m$^2$/g
BET after 1000° C./4 hours: 77 m$^2$/g
BET after 1100° C./4 hours: 49 m$^2$/g
BET after 1150° C./36 hours: 19 m$^2$/g
BET after 1200° C./4 hours: 18 m$^2$/g

The invention claimed is:

1. A calcined mixed oxide comprising Al-, Ce- and Zr-oxides, wherein said mixed oxide comprises
    cerium from 5% to 80% by weight,
    aluminium from 40% to 70% by weight,
    zirconium from 5% to 80% by weight, and
    rare earth metals (RE) other than cerium from 0% to 12% by weight,
    wherein cerium, zirconium, aluminium and rare earth metals (RE) are calculated as CeO$_2$, ZrO$_2$, Al$_2$O$_3$, or RE$_2$O$_3$, respectively, and
    wherein said calcined mixed oxide is formulated so as to maintain a surface area (BET) exceeding 20 m$^2$/g following calcination for 4 hours at 1200° C.

2. A calcined mixed oxide according to claim 1, wherein the calcined mixed oxide is formulated so as to maintain a surface area (BET) exceeding 40 m$^2$/g following calcination for 4 hours at 1200° C.

3. A calcined mixed oxide according to claim 1, wherein the calcined mixed oxide comprises:
    cerium from 5% to 40% by weight;
    zirconium from 5% to 40% by weight, and
    rare earth metals (RE) other than cerium from 0.1% to 9% by weight.

4. A calcined mixed oxide according to claim 3, wherein the calcined mixed oxide is formulated so as to maintain a surface area (BET) exceeding 40 m$^2$/g following calcination for 4 hours at 1200° C.

* * * * *